US012659152B2

(12) United States Patent
Dash et al.

(10) Patent No.: US 12,659,152 B2
(45) Date of Patent: Jun. 16, 2026

(54) SYSTEM AND METHOD FOR DYNAMICALLY ENCRYPTING AND INGESTING PRIVATE CLOUD DATA INTO A HYBRID CLOUD BASED ON DATA SENSITIVITY

(71) Applicant: Bank of America Corporation, Charlotte, NC (US)

(72) Inventors: Bikash Dash, Hyderabad (IN); Meera Lakshmi, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 41 days.

(21) Appl. No.: 18/754,308

(22) Filed: Jun. 26, 2024

(65) Prior Publication Data

US 2026/0005857 A1     Jan. 1, 2026

(51) Int. Cl.
*H04L 9/30*              (2006.01)
(52) U.S. Cl.
CPC ............ *H04L 9/302* (2013.01); *H04L 9/3066* (2013.01)
(58) Field of Classification Search
CPC .............................. H04L 9/302; H04L 9/3066
See application file for complete search history.

(56) References Cited

U.S. PATENT DOCUMENTS

| 10,719,742 B2 | 7/2020 | Shechtman et al. |
| 10,887,640 B2 | 1/2021 | Swaminathan et al. |
| 10,970,765 B2 | 4/2021 | Fang et al. |

| 11,010,637 B2 | 5/2021 | Visentini Scarzanella et al. |
| 11,256,555 B2 | 2/2022 | Goodsitt et al. |
| 11,373,390 B2 | 6/2022 | Zhao et al. |
| 11,386,496 B2 | 7/2022 | Zhu et al. |
| 11,483,318 B2 | 10/2022 | Trim et al. |
| 11,610,122 B2 | 3/2023 | Karras et al. |
| 11,625,576 B2 | 4/2023 | Wu et al. |
| 11,625,613 B2 | 4/2023 | Karras et al. |
| 11,854,562 B2 | 12/2023 | Zhang et al. |
| 2014/0068706 A1* | 3/2014 | Aissi ....................... G06F 21/60 726/1 |
| 2017/0005999 A1* | 1/2017 | Choyi ................. H04L 63/0435 |

(Continued)

OTHER PUBLICATIONS

Bikash Dash, et al.; System and Method for Identifying and Classifying Private and Public Cloud Data for Securing Cloud Migrations; U.S. Appl. No. 18/754,263, filed Jun. 26, 2024.

*Primary Examiner* — Rupal Dharia
*Assistant Examiner* — Devin E Almeida

(57) ABSTRACT

A system includes a memory configured to store a set of private valid source data. The system includes processors operably coupled to the memory and configured to access the set of private valid source data, and to execute a dynamic data encryption engine configured to identify a sensitivity level of the set of private valid source data and to encrypt the set of private valid source data in accordance with a data encryption algorithm. The data encryption algorithm is selected based on the identified sensitivity level. The processors further execute a data ingestion and dynamic decryption engine configured to ingest the encrypted set of private valid source data into the hybrid cloud computing and storage system, and in response to receiving a request to retrieve the encrypted set of private valid source data from the hybrid cloud computing and storage system, decrypt the encrypted set of private valid source data.

20 Claims, 4 Drawing Sheets

(56)　　　　　　References Cited

U.S. PATENT DOCUMENTS

| 2017/0149765 A1* | 5/2017 | Chang ................. H04L 63/0807 |
| 2019/0333198 A1 | 10/2019 | Wang et al. |
| 2019/0377955 A1 | 12/2019 | Swaminathan et al. |
| 2020/0151938 A1 | 5/2020 | Shechtman et al. |
| 2020/0211236 A1 | 7/2020 | Zhang et al. |
| 2020/0327662 A1 | 10/2020 | Liu et al. |
| 2020/0342234 A1 | 10/2020 | Gan et al. |
| 2021/0365584 A1* | 11/2021 | Harris ................. G06F 21/6245 |
| 2022/0353247 A1* | 11/2022 | Bastos ............... H04L 63/0428 |
| 2023/0351102 A1 | 11/2023 | Tran |
| 2025/0068745 A1* | 2/2025 | Sethi ..................... G06F 21/602 |
| 2025/0165407 A1* | 5/2025 | Huang ................... H04L 9/008 |

* cited by examiner

300 —

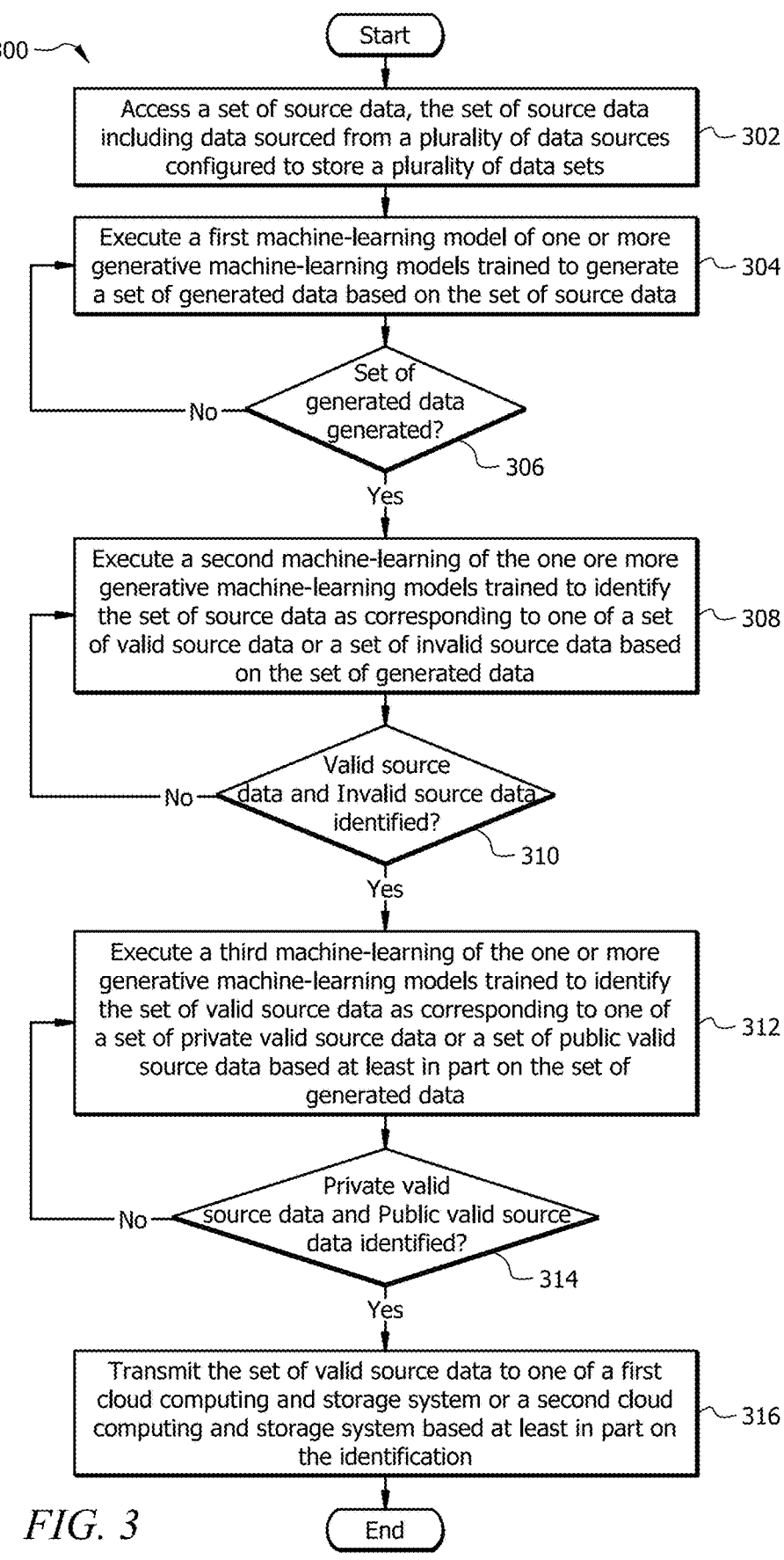

Start

Access a set of source data, the set of source data
including data sourced from a plurality of data sources
configured to store a plurality of data sets — 302

Execute a first machine-learning model of one or more
generative machine-learning models trained to generate
a set of generated data based on the set of source data — 304

Set of
generated data
generated? — 306

No

Yes

Execute a second machine-learning of the one ore more
generative machine-learning models trained to identify
the set of source data as corresponding to one of a set
of valid source data or a set of invalid source data based
on the set of generated data — 308

Valid source
data and Invalid source data
identified? — 310

No

Yes

Execute a third machine-learning of the one or more
generative machine-learning models trained to identify
the set of valid source data as corresponding to one of
a set of private valid source data or a set of public valid
source data based at least in part on the set of
generated data — 312

Private valid
source data and Public valid source
data identified? — 314

No

Yes

Transmit the set of valid source data to one of a first
cloud computing and storage system or a second cloud
computing and storage system based at least in part on
the identification — 316

End

SYSTEM AND METHOD FOR DYNAMICALLY ENCRYPTING AND INGESTING PRIVATE CLOUD DATA INTO A HYBRID CLOUD BASED ON DATA SENSITIVITY

TECHNICAL FIELD

The present disclosure relates generally to computing security, and, more specifically, to a system and method for dynamically encrypting and ingesting private cloud data into a hybrid cloud based on data sensitivity.

BACKGROUND

Certain cloud-computing based environments may include data stored across any number of databases and associated with any number of entities. For example, the data may include various user data or service data that may be stored to databases associated with respective entities, and that user data or service data may be accessed by any number of centralized or decentralized servers for servicing applications associated with various users. However, such cloud-computing based environments may be sometimes subjected to various threats and cyberattacks.

SUMMARY

The system and methods implemented by the system as disclosed in the present disclosure provide technical solutions to the technical problems discussed above by encrypting and ingesting private cloud data into a hybrid cloud based on data sensitivity. The disclosed system and methods provide several practical applications and technical advantages. Specifically, the present embodiments improve the security, reliability, and maintainability of cloud computing systems, software applications, and sensitive user data, as well as the one or more processors and memory on which the cloud computing systems, software applications, and sensitive user data may be executed and stored. The present embodiments provide an intelligent and secure cloud migration system that utilizes and executes a data orchestration engine, a dynamic data encryption engine, and a data ingestion and dynamic decryption engine in conjunction to: 1) route public cloud data directly to a public cloud computing and storage system and to route private cloud data to dynamic data encryption engine, 2) analyze the sensitivity level and confidentiality level of the private cloud data and encrypt the private cloud data utilizing one or more dynamic encryption algorithms determined based on the sensitivity level and confidentiality level, and 3) securely ingest the encrypted private cloud data into a hybrid cloud computing and storage system.

Thus, the present embodiments may identify and determine an appropriate private cloud data and public cloud data "fit" and security for both public cloud computing and storage systems and private cloud computing and storage systems environments based on the sensitivity level and confidentiality level of the private cloud data and public cloud data. Specifically, by identifying and determining an appropriate private cloud data and public cloud data "fit" and security for both public cloud computing and storage systems and private cloud computing and storage systems environments based on the sensitivity level and confidentiality level of the private cloud data and public cloud data, the present embodiments may identify, preempt, and secure against potential cyber threats, adversarial attacks, cyberattacks, data breaches, data loss, redundant data storage, or other security vulnerabilities that may be otherwise associated with the migration of cloud data, software applications, and sensitive user data between different cloud computing and storage systems.

The present embodiments are directed to systems and methods for encrypting and ingesting private cloud data into a hybrid cloud based on data sensitivity. In particular embodiments, a memory may be configured to store a set of private valid source data. For example, in one embodiment, the set of private valid source data may include private source data received from a data orchestration engine configured to route the set of private valid source data to a hybrid cloud computing and storage system. For example, in particular embodiments, the hybrid cloud computing and storage system may include a private cloud computing and storage system and a public cloud computing and storage system.

In particular embodiments, one or more processors operably coupled to the memory may be configured to access the set of private valid source data, and to execute a dynamic data encryption engine configured to identify a sensitivity level of the set of private valid source data and to encrypt the set of private valid source data in accordance with at least one data encryption algorithm of a plurality of data encryption algorithms. In one embodiment, the at least one data encryption algorithm may be selected based at least in part on the identified sensitivity level. In particular embodiments, the plurality of data encryption algorithms may include two or more of an advance encryption standard (AES) encryption algorithm, a Rivest-Shamir-Adleman (RSA) encryption algorithm, an elliptical curve cryptography (ECC) encryption algorithm, or a hybrid encryption algorithm. In particular embodiments, the one or more processors may be further configured to transfer the encrypted set of private valid source data between the private cloud computing and storage system and the public cloud computing and storage system.

In particular embodiments, the dynamic data encryption engine may be further configured to identify the sensitivity level of the set of private valid source data and to identify a confidentiality level of the set of private valid source data. In particular embodiments, the at least one data encryption algorithm may be selected based at least in part on the identified sensitivity level and the identified confidentiality level of the set of private valid source data. In particular embodiments, the one or more processors may be further configured to execute a data ingestion and dynamic decryption engine configured to ingest the encrypted set of private valid source data into the hybrid cloud computing and storage system, and in response to receiving a request to retrieve the encrypted set of private valid source data from the hybrid cloud computing and storage system, to decrypt the encrypted set of private valid source data based at least in part on the at least one data encryption algorithm.

In particular embodiments, the one or more processors may be further configured to receive the request to retrieve the encrypted set of private valid source data from a software application executing on the hybrid cloud computing and storage system. For example, in one embodiment, the one or more processors may be configured to provide the decrypted set of private valid source data for use by the software application executing on the hybrid cloud computing and storage system.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 3 illustrates a flowchart of an example method for identifying and classifying private and public cloud data for securing cloud migrations, in accordance with one or more embodiments of the present disclosure.

DETAILED DESCRIPTION

Example System

Figure 1:
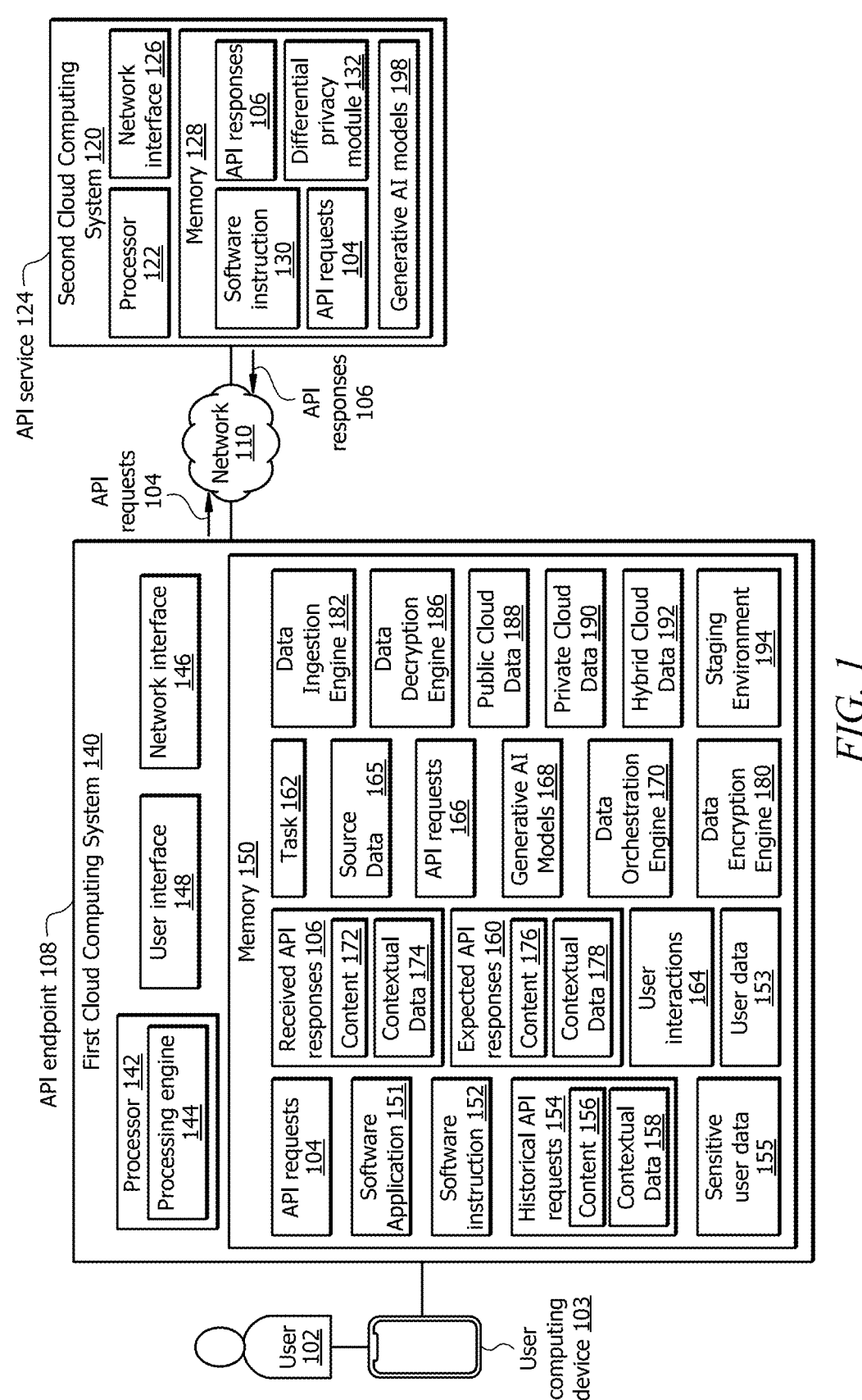
FIG. 1 is a block diagram of an intelligent and secure cloud migration system, in accordance with certain aspects of the present disclosure.

FIG. 1 is a block diagram of a public cloud computing and private cloud computing system 100. As depicted, the public cloud computing and private cloud computing system 100 may include a user 102, a user computing device 103, a first cloud computing system 140, a network 110, and a second cloud computing system 120. In particular embodiments, the user 102 may include a user associated with an institution, an organization, or an entity and that is associated with the sensitive user profile data 155. The sensitive user profile data 155 that may be associated with one or more of a large number of users external to the institution, the organization, or the entity. The network 110 enables communications and exchanges of data among components of the public cloud computing and private cloud computing system 100. In other embodiments, the public cloud computing and private cloud computing system 100 may not have all of the components listed and/or may have other elements instead of, or in addition to, those listed above.

In particular embodiments, the first cloud computing system 140 may include a processor 142 in signal communication with a memory 150. The memory 150 stores software instructions 152 that when executed by the processor 142, cause the processor 142 to perform one or more functions described herein. For example, when the software instructions 152 are executed, the processor 142 executes a processing engine 144 to identify and classify private cloud data 188, public cloud data 190, and hybrid cloud data 192 for securing cloud migrations in accordance with the presently disclosed embodiments.

The public cloud computing and private cloud computing system 100 may be configured as shown, or in any other configuration. In accordance with the presently disclosed embodiments, the first cloud computing system 140 may be suitable for dynamically adjusting interactive voice response features based on user speech characteristics. In one embodiment, the first cloud computing system 140 may include a private cloud computing and storage system, which may include, for example, a cloud computing environment and infrastructure that may be managed, controlled, and dedicated to a single organization or entity.

In another embodiment, the first cloud computing system 140 may include a hybrid cloud computing and storage system, which may include, for example, a mixed computing environment and infrastructure in which software applications are executing utilizing some combination of computing, storage, and services in both private cloud environments and public cloud environments. In contrast, the second cloud computing system 120 may include a public cloud computing and storage system, which may include, for example, a cloud computing environment and infrastructure that may be serviced to any number of organizations or entities as virtual resources accessible over the internet.

System Components

Network

The network 110 may be any suitable type of wireless and/or wired network, including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 110 may be configured to support any suitable type of communication protocol as would be appreciated by one of ordinary skill in the art.

Second Computing System

In particular embodiments, the second cloud computing system 120 may include a computing system that may be utilized to process data and communicate with computing devices (e.g., the first cloud computing system 140), databases, systems, etc., via the network 110 and may, in some embodiments, be associated with a third-party institution, organization, an entity. The second cloud computing system 120 may be utilized to generate API responses 106 in response to receiving the API requests 104 and/or API requests 166. In particular embodiments, the second cloud computing system 120 may include a processor 122 in signal communication with a network interface 126 and a memory 128. Memory 128 stores software instructions 152 that when executed by the processor 122, cause the second cloud computing system 120 to perform one or more functions described herein. For example, when the software instructions 152 are executed, the second cloud computing system 120 generates API responses 106 in response to receiving the API requests 104. The second cloud computing system 120 may be configured as shown, or in any other configuration.

The processor 122 may include one or more processors operably coupled to the memory 128. The processor 122 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). The processor 122 may be a programmable logic device, a microcontroller, a microprocessor, or any suitable combination of the preceding. The processor 122 is communicatively coupled to and in signal communication with the network interface 126 and memory 128. The one or more processors are configured to process data and may be implemented in hardware or software.

For example, the processor 122 may be 8-bit, 16-bit, 32-bit, 64-bit, or of any other suitable architecture. The processor 122 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute software instructions 152 to implement the functions disclosed herein, such as some or all of those described with respect to FIGS. 1-4. In some embodiments, the function described herein is implemented using logic units, FPGAs, ASICs, DSPs, or any other suitable hardware or electronic circuitry.

In particular embodiments, the processor 122 may execute one or more generative machine-learning models 198, such as one or more of a language model (LM), a large language model (LLM), one or more transformer-based machine-learning models, one or more sequence-to-sequence (Seq2Sec) models, or other similar generative machine-learning models 198. For example, in one embodiment, the one or more generative machine-learning models 198 may include a public, large pretrained language model that may, in some embodiments, be called by the first cloud computing system 140 to operate in conjunction with one or more private, on-premises generative machine-learning models 168.

The network interface 126 is configured to enable wired and/or wireless communications (e.g., via the network 110). The network interface 126 is configured to communicate data between the second cloud computing system 120 and other network devices, systems, or domain(s). For example, the network interface 126 may comprise a WIFI interface, a local area network (LAN) interface, a wide area network (WAN) interface, a modem, a switch, or a router. The processor 122 is configured to send and receive data using the network interface 126. The network interface 126 may be configured to use any suitable type of communication protocol.

The memory 128 may be volatile or non-volatile and may include a read-only memory (ROM), random-access memory (RAM), ternary content-addressable memory (TCAM), dynamic random-access memory (DRAM), and static random-access memory (SRAM), or other non-transitory computer-readable medium. Memory 128 may be implemented using one or more disks, tape drives, solid-state drives, and/or the like. Memory 128 is operable to store the software instructions 152, API requests 104, API responses 106, differential privacy module 132, and/or any other data or instructions. The software instructions 152 may include any suitable set of instructions, logic, rules, or code operable to execute the processor 122.

First Computing System

In particular embodiments, the first cloud computing system 140 may include any computing system that may be utilized to process data and communicate with computing devices (e.g., second cloud computing system 120), databases, systems, etc., via the network 110. The first cloud computing system 140 may be utilized to oversee operations of the processing engine 144. The first cloud computing system 140 is associated with an API endpoint 108 where API requests 104 are originated. In particular embodiments, the first cloud computing system 140 may include the processor 142 in signal communication with a network interface 146, a user interface 148, and memory 150. The first cloud computing system 140 may be configured as shown, or in any other configuration.

The processor 142 may include one or more processors operably coupled to the memory 150. The processor 142 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). The processor 142 may be a programmable logic device, a microcontroller, a microprocessor, or any suitable combination of the preceding. The processor 142 may be communicatively coupled to and in signal communication with the network interface 146, user interface 148, and memory 150. The one or more processors may be utilized to process data and may be implemented in hardware, software, or some combination thereof.

For example, the processor 142 may be 8-bit, 16-bit, 32-bit, 64-bit or of any other suitable architecture. The processor 142 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors may be utilized to execute software instructions 152 to implement the functions disclosed herein, such as some or all of those described with respect to FIGS. 1-4. In some embodiments, the function described herein is implemented using logic units, FPGAs, ASICs, DSPs, or any other suitable hardware or electronic circuitry.

The network interface 146 may be utilized to enable wired and/or wireless communications (e.g., via the network 110). The network interface 146 may be utilized to communicate data between the first cloud computing system 140 and other network devices, systems, or domain(s). For example, the network interface 146 may comprise a WIFI interface, a local area network (LAN) interface, a wide area network (WAN) interface, a modem, a switch, or a router. The processor 142 is configured to send and receive data using the network interface 146. The network interface 146 may be configured to use any suitable type of communication protocol.

The memory 150 may be volatile or non-volatile and may include a read-only memory (ROM), random-access memory (RAM), ternary content-addressable memory (TCAM), dynamic random-access memory (DRAM), and static random-access memory (SRAM). Memory 150 may be implemented using one or more disks, tape drives, solid-state drives, and/or the like. Memory 150 may be operable to store the software instructions 152, historical API requests 154, API requests 104, user data 153, user interactions 164, source data 165, received API responses 106, expected API responses 160, generated combinations of content 172, generated combination of contextual data 178, API requests 166, the one or more generative machine-learning models 168, task 162, a data orchestration engine 170, a data encryption engine 180, a data ingestion engine 182, a data decryption engine 186, public cloud data 188, private cloud data 190, hybrid cloud data 192, staging environment 194, and/or any other data, instructions, or compute engines. The software instructions 152 may include any suitable set of instructions, logic, rules, or code operable to execute the processor 142.

The memory 150 may also store instances of software application 151 that may be executing within the public cloud computing and private cloud computing system 100. In one embodiment, the instances of a software application 151 may include any number of instances a large software application suitable for hosting and servicing millions or billions of individual users and that may also interact via API requests 104 and API responses 106 with the computing system 120, and may be further associated with the sensitive user profile data 155.

Processing Engine

Processing engine 144 may be implemented by the processor 142 executing the software instructions 152, and may be utilized for dynamically adjusting interactive voice response features based on user speech characteristics. In some embodiments, the processing engine 144 may access historical API requests 154. In some embodiments, the processing engine 144 may generate one or more API requests 104 based on content 156 and contextual data 158 associated with the historical API requests 154. In some embodiments, the processing engine 144 may send the API requests 104 to the second cloud computing system 120. The second cloud computing system 120 generates API responses 106 to the received API requests 104. The second cloud computing system 120 sends the API responses 106 to the first cloud computing system 140.

The processing engine 144 parses the API responses 106 and detects content 172 and contextual data 174 associated with the API responses 106. The processing engine 144 compares each received API response 106 with a counterpart expected API responses 160, where each received API response 106 and the counterpart expected API responses 160 is associated with the same API request 104 and/or task 162, such as generating a user account number.

The processing engine 144 determines whether a received API response 106 corresponds with its counterpart expected API responses 160. If the processing engine 144 determines that the received API response 106 does not correspond with the counterpart expected API responses 160, the processing engine 144 identifies the difference between the received API response 106 and the counterpart expected API responses 160. In other words, the processing engine 144 identifies user interactions 164 made to the received API response 106, where the user interactions 164 is made to the received API response 106 by the second cloud computing system 120. In response, the processing engine 144 may update future API requests 166 associated with the particular task 162 according to the user interactions 164 made to the received API response 106.

Generating Combinations of Content and Contextual Data

The operational flow may begin at a training generation step where the processing engine 144 accesses the historical API requests 154, e.g., stored in the memory 150.

Each historical API request 154 may include content 156 and contextual data 158. For example, the content 156 associated with a historical API request 154 may include the data that is requested in the historical API request 154. In an example historical API request 154 that requests to generate a user account number for a user, the content 156 may include a name, a unique identifier number, phone number, address, user account number, and/or the like. The contextual data 158 associated with a historical API request 154 may include one or more a header, a trailer, an URL, a data format associated with the content 156, and/or the like.

The processing engine 144 identifies the content 156 and the contextual data 158 associated with the historical API requests 154. The processing engine 144 uses this information to generate the API requests 104. One reason for generating API requests 104 is to generate different combinations or different possibilities of content 172 and contextual data 178. Each combination of content 172 and contextual data 178 corresponds to one API request 104. In this manner, the processing engine 144 is able to detect any user interactions 164 made to any aspect of the process of generating API responses 106 compared to expected API responses 160.

In particular embodiments, the processing engine 144 may monitor the user data 153, user interactions 164, and/or source data 165. In particular embodiments, the processing engine 144 may execute the one or more generative machine-learning models 168, such as one or more of a language model (LM), a large language model (LLM), one or more transformer-based machine-learning models, one or more sequence-to-sequence (Seq2Sec) models, or other similar generative machine-learning models 168. In particular embodiments, the user data 153, user interactions 164, and/or source data 165 may include various data sourced from a number of different data sources to be ingested into one or more of the first cloud computing system 140 or the second cloud computing system 120.

In particular embodiments, the processing engine 144 may further train the one or more generative machine-learning models 168 based on the user data 153, user interactions 164, and/or source data 165. For example, in one embodiment, the one or more generative machine-learning models 168 may include one or more private, on-premises generative machine-learning models that may be trained and executed to identify and classify private and public cloud data for securing cloud migrations.

In one embodiment, the processing engine 144 may vary the content 156 and the contextual data 158 among one or more API requests 104. In the example of an API requests 104 for generating a user account number for a user, to generate the combinations of content 172, the processing engine 144 may vary different data fields of the content 156, such as names, addresses, phone numbers, use account numbers, number of digits used in the user account numbers, etc. associated with the historical API requests 154. In the example of an API requests 104 for generating a user account number for a user, to generate the combinations of contextual data 178, the processing engine 144 may vary different data fields of the contextual data 158, such as headers, trailers, URLs, data formats, etc. associated with the historical API requests 154.

In some cases, a data field in content 172 and/or in contextual data 158 may not be generated synthetically and/or randomly. For example, zip codes associated with addresses (in content 156) may be predefined and not generated synthetically and/or randomly. In another example, names of cities associated with addresses (in content 156) may be predefined and not generated synthetically and/or randomly. In another example, the data format in contextual data 158 may be predefined and not generated synthetically and/or randomly. In such cases, the processing engine 144 may search in the data lexicon that includes data that is predefined and/or not generated synthetically and/or randomly. The processing engine 144 may fetch such data from the data lexicon and use it in the various combinations of content 172 and various combinations of contextual data 178.

Public Computing and Private Computing Environments

In particular embodiments, the user 102 may provide one or more of user data 153, user interactions 164, and source data 165 to one or more of the first cloud computing system 140 or second cloud computing system 120. In particular embodiments, one or more of the user data 153, the user interactions 164, and the source data 165 may be ingested by the first cloud computing system 140 and/or exchanged between the first cloud computing system 140 and the second cloud computing system 120 and utilized by the one or more generative machine-learning models 168, the data orchestration engine 170, the data encryption engine 180, the data ingestion engine 182, and the data decryption engine 186, and the staging environment 194.

Encrypting and Ingesting Private Cloud Data into a Hybrid Cloud Based on Data Sensitivity Embodiments of the present disclosure discuss techniques system for encrypting and ingesting private cloud data into a hybrid cloud based on data sensitivity.

Figure 2:
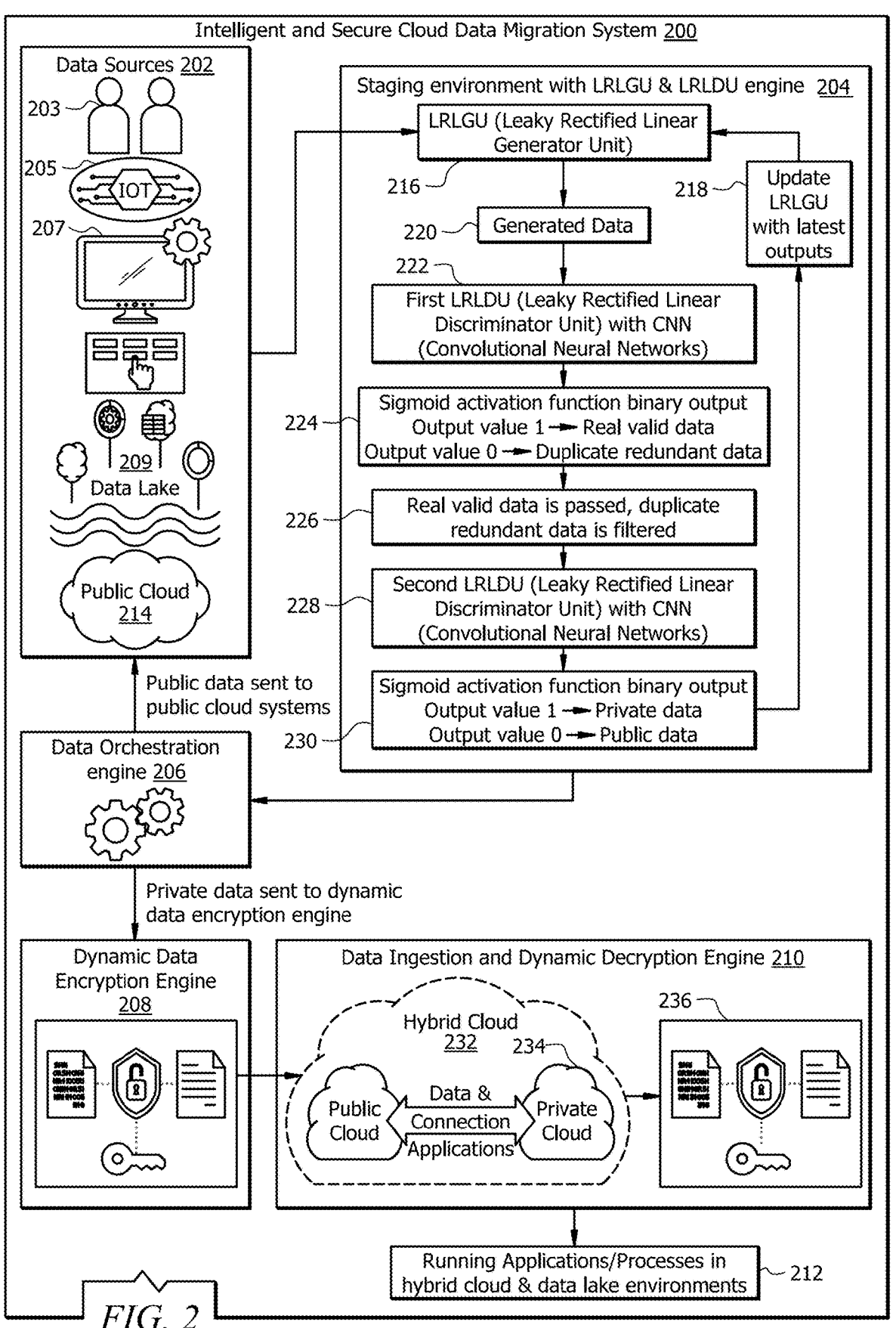
FIG. 2 illustrates a workflow diagram of an embodiment of an intelligent and secure cloud migration system, in accordance with one or more embodiments of the present disclosure.

FIG. 2 illustrates a workflow diagram of an embodiment of an intelligent and secure cloud migration system 200 for encrypting and ingesting private cloud data into a hybrid cloud based on data sensitivity, in accordance with certain aspects of the present disclosure. In particular embodiments, the workflow of the intelligent and secure cloud migration system 200 may be performed utilizing the first cloud computing system 140 as described above with respect to FIG. 1. As depicted, the workflow of the intelligent and secure cloud migration system 200 may begin with accessing a set of source data 202. For example, in one embodiment, the set of source data may include various data sourced from a number of different data sources, such as one or more of user data sources 203, Internet-of-Things (IoT) data sources 205, computing devices data sources 207, data lake data sources 209, and data sourced from a public cloud computing and storage system 214.

In particular embodiments, the workflow of the intelligent and secure cloud migration system 200 may then continue with the set of source data 202 being provided to a staging environment engine 204. In particular embodiments, the staging environment engine 204 may include one or more generative machine-learning models that may be trained and executed to identify and classify the set of source data 202 as corresponding to: 1) real and valid cloud data or duplicate and redundant cloud data and 2) public cloud data or private cloud data. In particular embodiments, the one or more generative machine-learning models may include one or more of a generative adversarial network (GAN), a bidirectional generative adversarial network (BiGAN), a deep convolutional generative adversarial network (DC-GAN), a conditional generative adversarial network (cGAN), a super resolution generative adversarial network (SRGAN), a style generative adversarial network (StyleGAN), or a cycle generative adversarial network (CycleGAN).

In particular embodiments, the workflow of the intelligent and secure cloud migration system 200 may then continue with the set of source data 202 being received by a leaky rectified linear generator unit (LRLGU) 216. Specifically, in particular embodiments, the LRLGU 216 may be trained and executed to generate a set of generated data 220 based on the set of source data 202. In particular embodiments, the workflow of the intelligent and secure cloud migration system 200 may then continue with the LRLGU 216 providing the set of generated data 220 to a first leaky rectified linear discriminator unit (LRLDU) 222. For example, in particular embodiments, the first LRLDU 222, which may include one or more convolutional neural networks (CNNs), may be trained and executed to identify the set of source data 202 as corresponding to one of a set of valid source data or a set of invalid source data based on the set of generated data 220.

Specifically, the first LRLDU 222 may be suitable for generating a prediction of a binary output 224 (e.g., "0" or "1") classifying the set of source data 202 as corresponding to one of a set of valid source data or a set of invalid source data. For example, in one embodiment, the first LRLDU 222 may generate a prediction of a binary value of "1" when the set of source data 202 corresponds to valid source data and generate a prediction of a binary value of "0" when the set of source data 202 corresponds to invalid source data. In particular embodiments, the workflow of the intelligent and secure cloud migration system 200 may then continue with the valid source data 226 being provided to a second leaky rectified linear discriminator unit (LRLDU) 228 and any invalid source data 226 being discarded or filtered.

In particular embodiments, the second LRLDU 228, which may include one or more convolutional neural networks (CNNs), may be trained and executed to identify the valid source data 226 as corresponding to one of a set of private valid source data or a set of public valid source data based on the set of generated data 220 and the valid source data 226. For example, in particular embodiments, the second LRLDU 228 may be suitable for receiving the valid source data 226 and generating a prediction of a binary output 230 (e.g., "0" or "1") classifying the valid source data 226 as corresponding to one of a set of private valid source data or a set of public valid source data. In one embodiment, the second LRLDU 228 may generate a prediction of a binary value of "1" when the valid source data 226 corresponds to private valid source data and generate a prediction of a binary value of "0" when the valid source data 226 corresponds to public valid source data.

In particular embodiments, the workflow of the intelligent and secure cloud migration system 200 may then continue with the staging environment engine 204 providing the private valid source data and the public valid source data to a data orchestration engine 206. In particular embodiments, the workflow of the intelligent and secure cloud migration system 200 may then continue with the data orchestration engine 206 providing the public valid source data directly to the public cloud computing and storage system 214 for storage and utilization. In particular embodiments, the workflow of the intelligent and secure cloud migration system 200 may then continue with the data orchestration engine 206 providing the private valid source data to adynamic data encryption engine 208.

In particular embodiments, the dynamic data encryption engine 208 may be utilized to identify a sensitivity level of the private valid source data and to encrypt the private valid source data in accordance with a data encryption algorithm of a number of data encryption algorithms. For example, in particular embodiments, the dynamic data encryption engine 208 may receive the private valid source data from the data orchestration engine 206 and analyze the private valid source data to identify a sensitivity level and a confidentiality level of the private valid source data. In particular embodiments, the dynamic data encryption engine 208 may then encrypt the private valid source data in accordance with at least one data encryption algorithm based on the sensitivity level and a confidentiality level of the private valid source data. For example, in one embodiment, the data encryption algorithm may include one or more of an advance encryption standard (AES) encryption algorithm, a Rivest-Shamir-Adleman (RSA) encryption algorithm, an elliptical curve cryptography (ECC) encryption algorithm, or a hybrid encryption algorithm.

In particular embodiments, upon the dynamic data encryption engine 208 encrypting the set of private valid source data in in accordance with its sensitivity level and confidentiality level, the workflow of the intelligent and secure cloud migration system 200 may then continue with the dynamic data encryption engine 208 providing the encrypted private valid source data to a data ingestion and dynamic encryption engine 210. In particular embodiments, the data ingestion and dynamic encryption engine 210 may then ingest the encrypted private valid source data into the hybrid cloud computing and storage system 232 for storage and utilization.

In particular embodiments, the workflow of the intelligent and secure cloud migration system 200 may then continue with the data ingestion and dynamic encryption engine 210 monitoring the hybrid cloud computing and storage system 232 and/or software application executing environment 212 for requests to retrieve the encrypted set of private valid source data from the hybrid cloud computing and storage system 232. In particular embodiments, in response to determining that a request to retrieve the encrypted private valid source data from the hybrid cloud computing and storage system 232 has been received, the workflow of the intelligent and secure cloud migration system 200 may continue with the dynamic decryption engine 236 decrypting the encrypted private valid source data based at least in part on the data encryption algorithm (e.g., an AES encryption algorithm, a RSA encryption algorithm, an ECC encryption algorithm, a hybrid encryption algorithm, and so forth) originally utilized to encrypt the private valid source data.

For example, in particular embodiments, the dynamic decryption engine 236 may retrieve the encrypted private valid source data from the hybrid cloud computing and storage system 232 and decrypt the encrypted set of private valid source data based on the data encryption algorithm utilized by the dynamic data encryption engine 208 to encrypt the private valid source data. In particular embodiments, the dynamic data encryption engine 208 may then provide the decrypted private valid source data to be utilized by the software application executing environment 212 executing, for example, on the hybrid cloud computing and storage system 232.

FIG. 3 illustrates a flowchart of an example method 300 for identifying and classifying private and public cloud data for securing cloud migrations, in accordance with one or more embodiments of the present disclosure. The method 300 may be performed utilizing the first cloud computing system 140 as described above with respect to FIG. 1. The method 300 may begin at block 302 with the first cloud computing system 140 accessing a set of private valid source data, in which the set of private valid source data includes private source data received from a data orchestration engine configured to route the set of private valid source data to a hybrid cloud computing and storage system. In one embodiment, the hybrid cloud computing and storage system 232 may include a private cloud computing and storage system and a public cloud computing and storage system, or otherwise some combination of a private cloud computing and storage system and a public cloud computing and storage system.

The method 300 may continue at block 304 with the first cloud computing system 140 executing a first machine-learning model of one of more generative machine-learning models trained to generate a set of generated data based on the set of source data. For example, in particular embodiments, the first machine-learning model may include a leaky rectified linear generator unit (LRLGU) 216 that may be suitable for generating the set of generated data 217. The method 300 may continue at decision 306 with the first cloud computing system 140 confirming whether the set of generated data has been generated. For example, in response to determining that the set of generated data 217 has not been generated, the method 300 may return to block 302 as discussed above.

On the other hand, in response to determining that the set of generated data 217 has been generated, the method 300 may then continue at block 308 with the first cloud computing system 140 executing a second machine-learning model of the one or more generative machine-learning models trained to identify the set of source data as corresponding to one of a set of valid source data or a set of invalid source data based on the set of generated data. For example, in particular embodiments, the second machine-learning model may include a first leaky rectified linear discriminator unit (LRLDU) 218 that may be suitable for generating a prediction of a binary output 224 (e.g., "0" or "1") classifying the set of source data as corresponding to one of a set of valid source data or a set of invalid source data. In one embodiment, the first LRLDU 222 may generate a prediction of a binary value of "1" when the input set of source data corresponds to valid source data and generate a prediction of a binary value of "0" when the input set of source data corresponds to invalid source data.

The method 300 may continue at decision 310 with the first cloud computing system 140 confirming whether the set of valid source data has been identified. For example, in response to determining that the set of valid source data 226 has not been identified, the method 300 may return to block 308 as discussed above. On the other hand, in response to determining that the set of valid source data 226 has been identified, the method 300 may then continue at block 312 with the first cloud computing system 140 executing a third machine-learning model of the one or more generative machine-learning models trained to identify the set of valid source data as corresponding to one of a set of private valid source data or a set of public valid source data based at least in part on the set of generated data.

For example, in particular embodiments, the third machine-learning model may include a second leaky rectified linear discriminator unit (LRLDU) 228 that may be suitable for receiving the set of valid source data 226 and generating a prediction of a binary output 224 (e.g., "0" or "1") classifying the set of valid source data 226 as corresponding to one of a set of private valid source data or a set of public valid source data. In one embodiment, the second LRLDU 228 may generate a prediction of a binary value of "1" when the received set of valid source data 226 corresponds to private valid source data and generate a prediction of a binary value of "0" when the received set of valid source data 226 corresponds to public valid source data.

The method 300 may continue at decision 310 with the first cloud computing system 140 confirming whether the private valid source data and public valid source has been data identified. In response to determining that the private valid source data and the public valid source data has not been identified, the method 300 may return to block 312. On the other hand, in response to determining that the private valid source data and the public valid source data has been identified, the method 300 may then conclude at block 316 with the first cloud computing system 140 transmitting the set of valid source data to one of a first cloud computing and storage system or a second cloud computing and storage system based at least in part on the identification. For example, in particular embodiments, the first cloud computing system 140 may transmit the identified public valid source data to the public cloud computing and storage system 214 for storage and utilization, and may further, in some embodiments, transmit the identified private valid source data to the hybrid cloud computing and storage system 232 for storage and utilization.

Thus, in accordance with the presently disclosed embodiments, the intelligent and secure cloud migration system 200 may improve the security, reliability, and maintainability of cloud computing systems, software applications, and sensitive user data, as well as the one or more processors 142 and memory 150 on which the cloud computing systems 140, 120, software applications 151, and sensitive user data 155 may be executed and stored by providing an intelligent and secure cloud migration system 200 that utilizes one or more generative machine-learning models 168 (e.g., generative artificial intelligence (AI) models), such as one or more generative adversarial networks (GANs) trained and executed to identify and classify various cloud data received from a data lake or one or more data sources as corresponding to: 1) real and valid cloud data or duplicate and redundant cloud data and 2) public cloud data or private cloud data. Once identified and classified, the intelligent and secure cloud migration system 200 may then transmit and store the public cloud data to a public cloud computing and storage system 214 and transmit and store the private cloud data to a private cloud computing and storage system and/or a hybrid cloud computing and storage system 232.

Thus, the present embodiments may identify and classify cloud data to be migrated as corresponding to either private cloud data or public cloud data prior to migrating the cloud data between different cloud computing and storage systems. Specifically, by identifying and classifying cloud data to be migrated as corresponding to private cloud data or public cloud data prior to the migration of the cloud data between different cloud computing and storage systems, the present embodiments may identify, preempt, and secure against potential cyber threats, adversarial attacks, cyberattacks, data breaches, data loss, redundant data storage, or other security vulnerabilities that may be otherwise associated with the migration of cloud data, software applications, and sensitive user data between different cloud computing and storage systems 140, 120.

Figure 4:
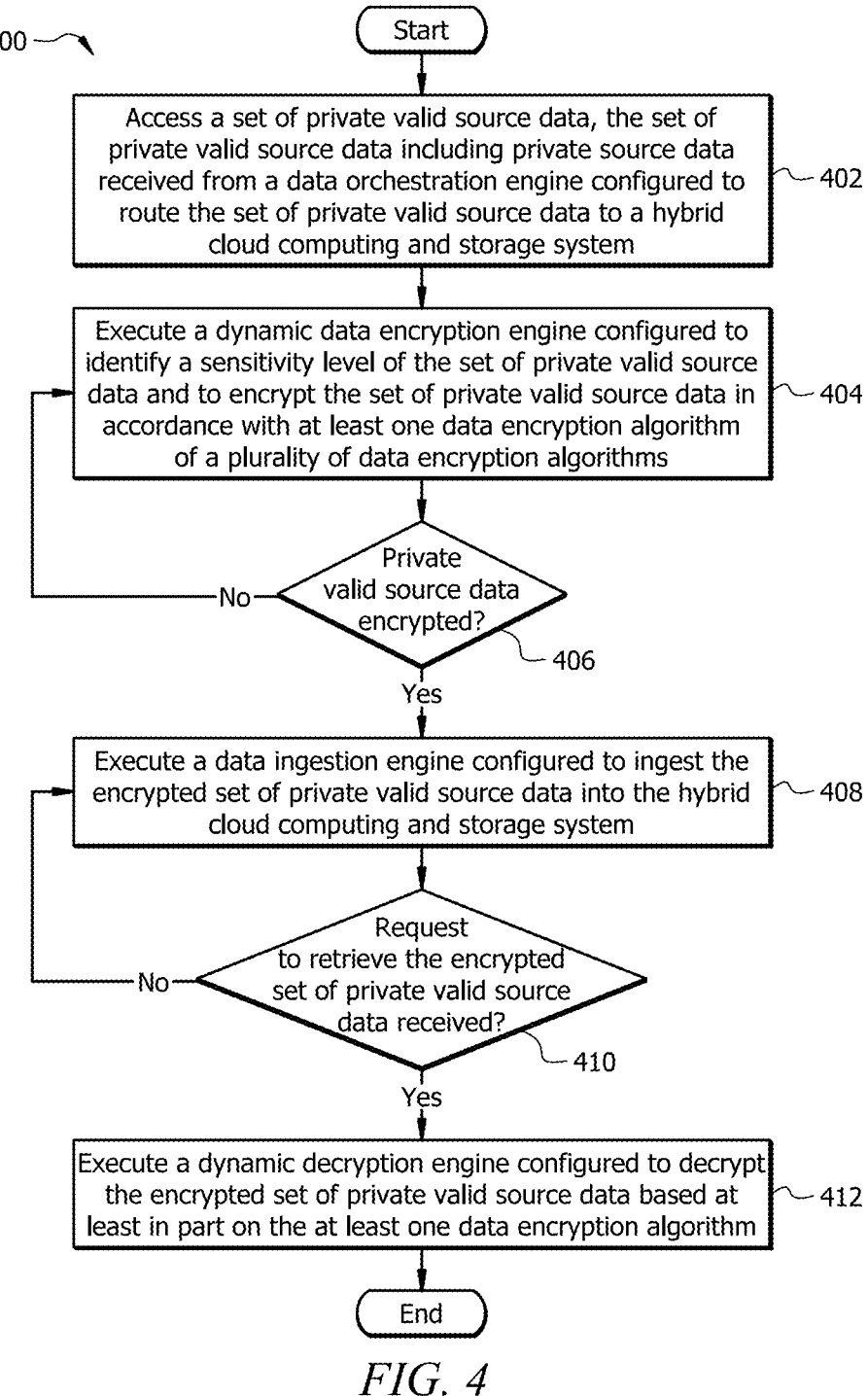
FIG. 4 illustrates a flowchart of an example method for encrypting and ingesting private cloud data into a hybrid cloud based on data sensitivity, in accordance with one or more embodiments of the present disclosure.

FIG. 4 illustrates a flowchart of an example method 400 for encrypting and ingesting private cloud data into a hybrid cloud based on data sensitivity, in accordance with one or more embodiments of the present disclosure. The method 400 may be performed utilizing the first cloud computing system 140 as described above with respect to FIG. 1. The method 400 may begin at block 402 with the first cloud computing system 140 accessing a set of private valid source data, in which the set of private valid source data including private source data received from a data orchestration engine configured to route the set of private valid source data to a hybrid cloud computing and storage system. In one embodiment, the hybrid cloud computing and storage system 232 may include a private cloud computing and storage system and a public cloud computing and storage system, or otherwise some combination of a private cloud computing and storage system and a public cloud computing and storage system.

The method 400 may continue at block 404 with the first cloud computing system 140 executing a dynamic data encryption engine configured to identify a sensitivity level of the set of private valid source data and to encrypt the set of private valid source data in accordance with at least one data encryption algorithm of a plurality of data encryption algorithms. For example, in particular embodiments, the dynamic data encryption engine 208 may receive the identified private valid source data (e.g., identified by the second LRLDU 228 as discussed above with respect to FIG. 3) from the data orchestration engine 206 and analyze the private valid source data to identify a sensitivity level and a confidentiality level of the private valid source data. In particular embodiments, the dynamic data encryption engine 208 may then encrypt the private valid source data in accordance with at least one data encryption algorithm, such as one or more of an advance encryption standard (AES) encryption algorithm, a Rivest-Shamir-Adleman (RSA) encryption algorithm, an elliptical curve cryptography (ECC) encryption algorithm, or a hybrid encryption algorithm.

The method 400 may continue at decision 406 with the first cloud computing system 140 confirming whether the set of private valid source data has been encrypted in accordance with its sensitivity level and confidentiality level. In particular embodiments, in response to determining that the set of private valid source data has not been encrypted in accordance with its sensitivity level and confidentiality level, the method 400 may return to block 402 as discussed above. On the other hand, in response to determining that the set of private valid source data has been encrypted in accordance with its sensitivity level and confidentiality level, the method 400 may then continue at block 408 with the first cloud computing system 140 executing a data ingestion engine configured to ingest the encrypted set of private valid source data into the hybrid cloud computing and storage system.

For example, in particular embodiments, upon the dynamic data encryption engine 208 encrypting the set of private valid source data in accordance with its sensitivity level and confidentiality level, the dynamic data encryption engine 208 may then provide the encrypted private valid source data to the data ingestion and dynamic encryption engine 210, which may ingest the encrypted set of private valid source data into the hybrid cloud computing and storage system 232. The method 400 may continue at decision 410 with the first cloud computing system 140 determining whether a request to retrieve the encrypted set of private valid source data from the hybrid cloud computing and storage system 232 has been received.

In particular embodiments, in response to determining that a request to retrieve the encrypted set of private valid source data from the hybrid cloud computing and storage system 232 has not been received, the method 400 may return to block 408 as discussed above. On the other hand, in response to determining that a request to retrieve the encrypted set of private valid source data from the hybrid cloud computing and storage system 232 has been received, the method 400 may then conclude at block 412 with the first cloud computing system 140 executing a dynamic decryption engine configured to decrypt the encrypted set of private valid source data based at least in part on the at least one data encryption algorithm.

For example, in particular embodiments, the dynamic decryption engine 236 may retrieve the encrypted set of private valid source data from the hybrid cloud computing and storage system 232 and decrypt the encrypted set of private valid source data based on the data encryption algorithm utilized by the dynamic data encryption engine 208 to encrypt the private valid source data. In particular embodiments, the dynamic data encryption engine 208 may then provide the decrypted set of private valid source data to be utilized by one or more software applications executing, for example, on the hybrid cloud computing and storage system 232.

Thus, in accordance with the presently disclosed embodiments, the intelligent and secure cloud migration system 200 may improve the security, reliability, and maintainability of cloud computing systems, software applications, and sensitive user data, as well as the one or more processors 142 and memory 150 on which the cloud computing systems 140, 120, software applications 151, and sensitive user data 155 may be executed and stored by providing an intelligent and secure cloud migration system 200 that utilizes and executes a data orchestration engine 206, a dynamic data encryption engine 208, and a data ingestion and dynamic decryption engine 210 in conjunction to: 1) route public cloud data directly to a public cloud computing and storage system 214 and to route private cloud data to dynamic data encryption engine 208, 2) analyze the sensitivity level and confidentiality level of the private cloud data and encrypt the private cloud data utilizing one or more dynamic encryption algorithms determined based on the sensitivity level and confidentiality level, and 3) securely ingest the encrypted private cloud data into a hybrid cloud computing and storage system 232.

Thus, the present embodiments may identify and determine an appropriate private cloud data and public cloud data "fit" and security for both public cloud computing and storage systems and private cloud computing and storage systems environments based on the sensitivity level and confidentiality level of the private cloud data and public cloud data. Specifically, by identifying and determining an appropriate private cloud data and public cloud data "fit" and security for both public cloud computing and storage systems and private cloud computing and storage systems environments based on the sensitivity level and confidentiality level of the private cloud data and public cloud data, the present embodiments may identify, preempt, and secure against potential cyber threats, adversarial attacks, cyberattacks, data breaches, data loss, redundant data storage, or other security vulnerabilities that may be otherwise associated with the migration of cloud data, software applications, and sensitive user data between different cloud computing and storage systems 140, 120.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system, comprising:
    a memory configured to store source data, wherein the source data comprises data sourced from a plurality of data sources configured to store a plurality of data sets; and one or more processors operably coupled to the memory and configured to:
    access the source data;
    execute a first machine-learning model of one or more generative machine-learning models trained to generate generated data based at least in part on the source data, wherein the generated data comprises synthetic data at least partially representative of the source data;
    execute a second machine-learning model of the one or more generative machine-learning models trained to identify the generated data as corresponding to one of valid source data or invalid source data by discriminating between the source data and the generated data;
    in response to the second machine-learning model identifying the generated data as corresponding to valid source data, execute a third machine-learning model of the one or more generative machine-learning models trained to identify the valid source data as corresponding to one of private valid source data or public valid source data based at least in part on the valid source data; and
    in response to determining that the valid source data corresponds to private valid source data:
        execute a dynamic data encryption engine configured to identify a sensitivity level of the private valid source data and to encrypt the private valid source data in accordance with at least one data encryption algorithm of a plurality of data encryption algorithms, wherein the at least one data encryption algorithm is selected based at least in part on the identified sensitivity level;
        execute a data ingestion engine configured to ingest the encrypted private valid source data into a hybrid cloud computing and storage system; and
        in response to receiving a request to retrieve the encrypted private valid source data from the hybrid cloud computing and storage system, execute a dynamic decryption engine configured to decrypt the encrypted private valid source data based at least in part on the at least one data encryption algorithm.

2. The system of claim 1, wherein the plurality of data encryption algorithms comprises two or more of an advance encryption standard (AES) encryption algorithm, a Rivest-Shamir-Adleman (RSA) encryption algorithm, an elliptical curve cryptography (ECC) encryption algorithm, or a hybrid encryption algorithm.

3. The system of claim 1, wherein the hybrid cloud computing and storage system comprises a private cloud computing and storage system and a public cloud computing and storage system, and wherein the one or more processors are further configured to transfer the encrypted private valid source data between the private cloud computing and storage system and the public cloud computing and storage system.

4. The system of claim 1, wherein the dynamic data encryption engine is further configured to identify the sensitivity level of the private valid source data and to identify a confidentiality level of the private valid source data.

5. The system of claim 4, wherein the at least one data encryption algorithm is selected based at least in part on the identified sensitivity level and the identified confidentiality level of the private valid source data.

6. The system of claim 1, wherein the one or more processors are further configured to receive the request to retrieve the encrypted private valid source data from a software application executing on the hybrid cloud computing and storage system.

7. The system of claim 6, wherein the dynamic decryption engine is further configured to provide the decrypted private valid source data for use by the software application executing on the hybrid cloud computing and storage system.

8. A method, comprising:

accessing source data, wherein the source data comprises sourced from a plurality of data sources configured to store a plurality of data sets;

executing a first machine-learning model of one or more generative machine-learning models trained to generate generated data based at least in part on the source data, wherein the generated data comprises synthetic data at least partially representative of the source data;

executing a second machine-learning model of the one or more generative machine-learning models trained to identify the generated data as corresponding to one of valid source data or invalid source data by discriminating between the source data and the generated data;

in response to the second machine-learning model identifying the generated data as corresponding to valid source data, executing a third machine-learning model of the one or more generative machine-learning models trained to identify the valid source data as corresponding to one of private valid source data or public valid source data based at least in part on the valid source data; and in response to determining that the valid source data corresponds to private valid source data:

executing a dynamic data encryption engine configured to identify a sensitivity level of the private valid source data and to encrypt the private valid source data in accordance with at least one data encryption algorithm of a plurality of data encryption algorithms, wherein the at least one data encryption algorithm is selected based on the identified sensitivity level;

executing a data ingestion engine configured to ingest the encrypted set of private valid source data into a hybrid cloud computing and storage system; and in response to receiving a request to retrieve the encrypted private valid source data from the hybrid cloud computing and storage system, executing a dynamic decryption engine configured to decrypt the encrypted private valid source data based at least in part on the at least one data encryption algorithm.

9. The method of claim 8, wherein the plurality of data encryption algorithms comprises two or more of an advance encryption standard (AES) encryption algorithm, a Rivest-Shamir-Adleman (RSA) encryption algorithm, an elliptical curve cryptography (ECC) encryption algorithm, or a hybrid encryption algorithm.

10. The method of claim 8, wherein the hybrid cloud computing and storage system comprises a private cloud computing and storage system and a public cloud computing and storage system, and wherein the method further comprises transferring the encrypted private valid source data between the private cloud computing and storage system and the public cloud computing and storage system.

11. The method of claim 8, wherein the dynamic data encryption engine is further configured to identify the sensitivity level of the private valid source data and a confidentiality level of the private valid source data.

12. The method of claim 11, wherein the at least one data encryption algorithm is selected based at least in part on the identified sensitivity level and the identified confidentiality level of the private valid source data.

13. The method of claim 8, wherein receiving the request to retrieve the encrypted private valid source data comprises receiving the request to retrieve the encrypted private valid source data from a software application executing on the hybrid cloud computing and storage system.

14. The method of claim 13, wherein the dynamic decryption engine is further configured to provide the decrypted private valid source data for use by the software application executing on the hybrid cloud computing and storage system.

15. A non-transitory computer-readable medium storing instructions that, when executed by one or more processors, cause the one or more processors to:

access source data, wherein the source data comprises sourced from a plurality of data sources configured to store a plurality of data sets;

execute a first machine-learning model of one or more generative machine-learning models trained to generate generated data based at least in part on the source data, wherein the generated data comprises synthetic data at least partially representative of the source data;

execute a second machine-learning model of the one or more generative machine-learning models trained to identify the generated data as corresponding to one of valid source data or invalid source data by discriminating between the source data and the generated data;

in response to the second machine-learning model identifying the generated data as corresponding to valid source data, execute a third machine-learning model of the one or more generative machine-learning models trained to identify the valid source data as corresponding to one of private valid source data or public valid source data based at least in part on the valid source data; and in response to determining that the valid source data corresponds to private valid source data:

execute a dynamic data encryption engine configured to identify a sensitivity level of the private valid source data and to encrypt the private valid source data in accordance with at least one data encryption algorithm of a plurality of data encryption algorithms, wherein the at least one data encryption algorithm is selected based on the identified sensitivity level;

execute a data ingestion engine configured to ingest the encrypted private valid source data into a hybrid cloud computing and storage system; and in response to receiving a request to retrieve the encrypted private valid source data from the hybrid cloud computing and storage system, execute a dynamic decryption engine configured to decrypt the encrypted private valid source data based at least in part on the at least one data encryption algorithm.

16. The non-transitory computer-readable medium of claim 15, wherein the plurality of data encryption algorithms comprises two or more of an advance encryption standard (AES) encryption algorithm, a Rivest-Shamir-Adleman (RSA) encryption algorithm, an elliptical curve cryptography (ECC) encryption algorithm, or a hybrid encryption algorithm.

17. The non-transitory computer-readable medium of claim 15, wherein the hybrid cloud computing and storage system comprises a private cloud computing and storage system and a public cloud computing and storage system, and wherein the one or more processors are further configured to transfer the encrypted private valid source data between the private cloud computing and storage system and the public cloud computing and storage system.

18. The non-transitory computer-readable medium of claim 15, wherein the dynamic data encryption engine is further configured to identify the sensitivity level of the private valid source data and a confidentiality level of the private valid source data.

19. The non-transitory computer-readable medium of claim 18, wherein the at least one data encryption algorithm is selected based at least in part on the identified sensitivity level and the identified confidentiality level of the private valid source data.

20. The non-transitory computer-readable medium of claim 15, wherein the instructions further cause the one or more processors to receive the request to retrieve the encrypted private valid source data from a software application executing on the hybrid cloud computing and storage system.

\* \* \* \* \*